United States Patent [19]

Sakai et al.

[11] Patent Number: 5,183,843
[45] Date of Patent: Feb. 2, 1993

[54] POLYAMIDE RESIN COMPOSITIONS

[75] Inventors: Hideki Sakai; Kazuo Ishiwatari; Fumitoshi Ikejiri, all of Wakicho, Japan

[73] Assignee: Mitsui Petrochemical Industries, Ltd., Tokyo, Japan

[21] Appl. No.: 410,129

[22] Filed: Sep. 21, 1989

[30] Foreign Application Priority Data

Sep. 22, 1988 [JP] Japan .................. 63-238430
Aug. 31, 1989 [JP] Japan .................. 1-225754

[51] Int. Cl.$^5$ .............................. C08K 5/11
[52] U.S. Cl. ...................... 524/318; 524/317; 524/374; 524/398; 524/400; 524/606
[58] Field of Search ............... 524/394, 398, 400, 317, 524/318, 606

[56] References Cited

U.S. PATENT DOCUMENTS

| | | | |
|---|---|---|---|
| 3,228,898 | 1/1966 | Illing et al. | 524/606 |
| 3,915,912 | 10/1975 | Ishicawa et al. | 524/318 |
| 3,962,524 | 6/1976 | Miyamoto et al. | 524/606 |
| 3,968,071 | 6/1976 | Miyamoto et al. | 524/606 |
| 4,970,255 | 11/1990 | Reimann et al. | 524/318 |

Primary Examiner—Paul R. Michl
Assistant Examiner—Edward Cain
Attorney, Agent, or Firm—Sherman and Shalloway

[57] ABSTRACT

A polyamide resin composition which comprises: (A) an aromatic polyamide resin comprising preferably a terephthalic acid component and a diamine component comprising at least one of an aliphatic diamine component and an alicyclic diamine component; (B) a fibrous reinforcement; and (C) at least one additive selected from the group consisting of a salt of the group I, II and III metals of the periodic table of a higher fatty acid salt and an acid ester, a partially saponified ester and a metal salt of an aliphatic carboxylic acid of 26–32 carbons.

The resin composition is of high fluidity and mold-releasing properties as well as of high heat resistance and rigidity, so that the composition can be molded with decomposition of the resins.

31 Claims, No Drawings

POLYAMIDE RESIN COMPOSITIONS

This invention relates to a polyamide resin composition. Polyamide resins are of well balanced properties and are in wide use as engineering plastics, in such applications as, for example, automobile or electric parts. In particular, such aromatic polyamide resins as composed of aromatic dicarboxylic acids, e.g., terephthalic acid, and aliphatic diamines, e.g., hexamethylenediamine, have higher melting points and higher mechanical properties than aliphatic polyamide resins, and thus they have a great expectation of use in much broader fields.

Aromatic polyamide resin compositions are also known which contain fibrous reinforcements such as glass fibers to further improve heat resistance or rigidity of the resins.

However, the polyamide resins and their compositions are of small fluidity as well as of high melting points, so that it is necessary that they be molded or processed at high temperatures near to their thermal decomposition temperatures. Further, when the polyamide resins or their compositions are injection-molded, they produce large amounts of friction heat and very often they thermally decompose to lower molecular weight resins, to deteriorate in the properties which the polyamide resins or their compositions originally possess. Therefore, it has been difficult to produce molded articles having thin walls or complicated shapes by injection molding because of particularly large friction heat liberated.

As a further defect, the aromatic polyamide resin compositions are in general inferior in mold-releasing properties, so that thin-walled molded articles are apt to be broken when they are released from molds.

As a still further defect, the aromatic polyamide resin compositions are of small fluidity, and accordingly the supply of the compositions with molding machines from hoppers are not carried out smoothly in injection or extrusion molding. Thus, metering of the compositions is of insufficient accuracy, and the resultant individual molded articles are apt to be uneven in quality.

There is described in Japanese Patent Laid-open No. 61-188457 a polyamide resin composition for thin-walled articles which contains nylon 46, glass fibers in amounts of 10-80 parts by weight in relation to 100 parts by weight of the resin, and a lubricant in amounts of 0.001-1 part by weight in relation to 100 parts by weight of the total of the resin and the glass fibers. A further polyamide resin composition for thin-walled articles is described in Japanese Patent Laid-open No. 61-188458 which contains nylon 46 and a lubricant such as bisamides, fatty acid salts of the group I, II or III metals of the periodic table, polyethylene glycol, aliphatic carboxylic acids of 26-32 carbons or their derivatives.

In those prior references, it is said that nylon 46 which has a high melting point is improved in moldability, and the resin is prevented from reduction of molecular weight of the resin in molding. Further, there are described therein that the nylon 46 includes mixtures or copolymers of nylon 46 with nylon 66/6T (terephthalic acid component) or nylon 66/6T/6I (isophthalic acid component).

However, these prior polyamide resin compositions contain nylon 46, which is one of aliphatic polyamide resins, as a main component. Therefore, it is not expected that aliphatic polyamide resin compositions are improved to a great extent in heat resistance by incorporating small amounts of aromatic polyamide resins thereinto, compared with the original aliphatic polyamide resins.

Aromatic polyamide resins have much higher melting points, much higher molding temperatures and much higher heat deflection temperatures than aliphatic polyamide resins, and aromatic polyamide resins are different in molecular structures from aliphatic polyamide resins. Therefore, nothing has heretofore been known about improvement of moldability of compositions which contain aromatic polyamide resins as a main component.

It is, therefore, an object of the invention to provide an aromatic polyamide resin composition which is of excellent fluidity and mold-releasing properties, as well as of high heat resistance and rigidity, and thus which is prevented from reduction of molecular weight in molding.

In accordance with the invention, there is provided a polyamide resin composition which comprises:

(A) an aromatic polyamide resin comprising (a) a dicarboxylic acid component which comprises an aromatic dicarboxylic acid component and (b) a diamine component comprising at least one of an aliphatic diamine component and an alicyclic diamine component;

(B) a fibrous reinforcement in amounts of 0-200 parts by weight in relation to 100 parts by weight of the polyamide resin; and (C) at least one additive selected from the group consisting of a higher fatty acid salt and a derivative of an aliphatic carboxylic acid of 26-32 carbons, the metal being selected from the group consisting of the I, II and III group metals of the periodic table, and the derivative being selected from the group consisting of an acid ester, a partially saponified ester and a metal salt, in amounts of 0.01-5 parts by weight in relation to 100 parts by weight of the polyamide resin.

The aromatic polyamide resin used comprises a dicarboxylic acid component and a diamine component. The dicarboxylic acid component may be terephthalic acid as a first aromatic dicarboxylic acid component or the others as a second aromatic dicarboxylic acid component or a mixture of these. There may be mentioned as such second aromatic dicarboxylic acid components, for example, isophthalic acid, phthalic acid, 2-methylterephthalic acid or naphthalene dicarboxylic acid component.

However, the dicarboxylic acid component is preferably composed of terephthalic acid in amounts of 40-100 mole % and at least one of the second aromatic dicarboxylic acid components and aliphatic dicarboxylic acid components in amounts of 60-0 mole %. Isophthalic acid or naphthalene dicarboxylic acid component is especially preferred as the second aromatic dicarboxylic acid components, and isophthalic acid is most preferred. The aliphatic dicarboxylic acid components used are preferably of 4-20 carbons, more preferably of 6-12 carbons, and include, for example, succinic acid, adipic acid, azelaic acid, sebacic acid, decane dicarboxylic acid, undecane dicarboxylic acid or dodecane dicarboxylic acid component, among which is in particular preferred adipic acid.

When the polyamide resins used are composed of the dicarboxylic acid component and diamine component in specific amounts as above set forth, the resultant resin compositions provide molded articles which have high heat resistance, and hence high resistance to heat degradation or high thermal deflection temperature, as well as high mechanical properties such as tensile strength, flexural strength or wear resistance, chemical resistance or water resistance.

However, when requisites to resin compositions permit, the terephthalic acid component may be contained in amounts of not more than 40 mole %, and the second aromatic dicarboxylic acid component other than the terephthalic acid component in amounts of more than 60 mole %, respectively, in the dicarboxylic acid component. In extreme cases, the dicarboxylic acid component may be composed only of the second aromatic dicarboxylic acid component.

Tribasic or more polybasic aromatic carboxylic acid component may be used together with the aromatic dicarboxylic acid component, usually in amounts of not more than 10 mole % based on the total of di- and tri- or more polybasic carboxylic acid components. The tribasic or more polybasic aromatic carboxylic acid components usable may be exemplified by trimellitic acid or pyromellitic acid.

The diamine component used may be an aliphatic diamine or an alicyclic diamine component, or a mixture of these. The aliphatic diamine component may be linear or branched. Preferred diamines are linear or branched alkylene diamines of 4–25 carbons, most preferably of 6–18 carbons. Thus, the preferred linear alkylene diamine component may be exemplified by 1,6-diaminohexane, 1,7-diaminoheptane, 1,8-diaminooctane, 1,9-diaminononane, 1,10-diaminodecane, 1,11-diaminoundecane or 1,12-diaminododecane component. The preferred branched alkylene diamine component may be exemplified by 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane or 1,9-diamino-5-methylnonane component.

Among the diamines as above, the linear alkylene diamine components are preferred, and in particular, 1,6-diaminohexane, 1,8-diaminooctane, 1,10-diaminodecane or 1,12-diaminododecane component, or a mixture of two or more of these are preferred.

The alicyclic diamine components used, in turn, are usually of 6–25 carbons, and contain at least one alicyclic ring. The components may be exemplified by 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4′-diamino-3,3′-dimethyldicyclohexylmethane, 4,4′-diamino-3,3′-dimethyldicyclohexylpropane, 4,4′-diamino-3,3′-dimethyl-5,5′-dimethyldicyclohexylmethane, 4,4′-diamino-3,3′-dimethyl-5,5′-dimethyldicyclohexylpropane, $\alpha,\alpha'$-bis(4-aminocyclohexyl)-p-diisopropylbenzene, $\alpha,\alpha'$-bis(4-aminocyclohexyl)-m-diisopropylbenzene, $\alpha,\alpha'$-bis(4-aminocyclohexyl)-1,4-diisopropylcyclohexane or $\alpha,\alpha'$-bis(4-aminocyclohexyl)-1,3-diisopropylcyclohexane component.

Among the alicyclic diamine components as above mentioned are preferred bis(aminomethyl)cyclohexanes, bis(4-aminocyclohexyl)methane or 4,4′-diamino-3,3′-dimethyldicyclohexylmethane, and bis(4-aminocyclohexyl)methane, 1,3-bis(aminocyclohexyl)methane or 1,3-bis(aminomethyl)cyclohexane are most preferred.

In accordance with the invention, when the dicarboxylic acid component is mainly composed of terephthalic acid component, and more specifically when the dicarboxylic acid component contains the terephthalic acid component preferably in amounts of not less than 60 mole %, the diamine component is preferably composed of such aliphatic diamine components as described hereinbefore. Further, it is preferred that the amount of the terephthalic acid component in the dicarboxylic acid components be defined by the number of carbons in the aliphatic diamine components.

More specifically, when the aliphatic diamine component is composed of carbon chains of 5–11 carbons, it is preferred that the terephthalic acid component be contained in amounts of 50–100 mole % in the dicarboxylic acid components. The other dicarboxylic acid components are accordingly contained in amounts of 50–0 mole % in the dicarboxylic acid components, and they may be any one of the second aromatic dicarboxylic acid components, an aliphatic dicarboxylic acid component or a mixture of these.

In more detail, when the aliphatic diamine component is composed of short linear carbon chains of 5–7 carbons, it is preferred that the terephthalic acid component be contained in amounts of 50–85 mole % in the dicarboxylic acid components. The other dicarboxylic acid components are accordingly contained in amounts of 50–15 mole % in the dicarboxylic acid components, and they may be any one of the second aromatic dicarboxylic acid components, an aliphatic dicarboxylic acid component or a mixture of these.

When the aliphatic diamine component is composed of an intermittent length of carbon chains of 6–11 carbons, preferably of 6–10 carbons, it is preferred that the terephthalic acid component be contained in amounts of 50–100 mole % in the dicarboxylic acid components. The other dicarboxylic acid components may be any one of the second aromatic dicarboxylic acid components, an aliphatic dicarboxylic acid component or a mixture of these, and are contained in amounts of 50–0 mole % in the dicarboxylic acid components.

On the other hand, when the aliphatic diamine component is composed of a relatively long carbon chains of 10–18 carbons, then it is preferred that the terephthalic acid component be contained in amounts of 75–100 mole % in the dicarboxylic acid components. The other dicarboxylic acid components may be any one of the second aromatic dicarboxylic acid components, an aliphatic dicarboxylic acid component or a mixture of these, and are contained in amounts of 25–0 mole % in the dicarboxylic acid components.

As above set forth, when the amounts of the terephthalic acid component, the other aromatic dicarboxylic acid component and aliphatic dicarboxylic acid component in the dicarboxylic acid component are specified in accordance with the number of carbons in the aliphatic diamine components, the resultant resin composition is of high moldability, but also molded articles therewith have high heat resistance, and hence high resistance to heat degradation and high thermal deflection temperature, and are excellent in mechanical properties such as flexural strength or wear resistance.

The diamine components may contain aromatic diamine components in addition to the alkylene diamine components. There may be mentioned as such aromatic diamine components, for example, m-xylylenediamine or p-xylylenediamine.

The polyamide resin used in the composition of the invention have an intrinsic viscosity [η] usually of not less than 0.5 dl/g, preferably not less than 0.6 dl/g, most preferably in the range of 0.7-3.0 dl/g, as measured in concentrated sulfuric acid at a temperature of 30° C.

The above mentioned polyamide resin may be produced by condensation polymerization in solution of a dicarboxylic acid halide and a diamine corresponding to the dicarboxylic acid and diamine components as described hereinbefore, as already described, for example, in P. W. Morgan, Polymer Reviews, 10, Condensation Polymers by Interfacial and Solution Methods, Interscience Publishers (1965) or Makromol. Chem., 47, 93-113 (1961). A known interfacial method also provides the above polyamide resin.

The polyamide resin may also be produced by melt methods, wherein an aromatic dicarboxylic acid and a diamine or its polyamide salt correspondening to the aromatic dicarboxylic acid component and diamine component, respectively, are polycondensed together in the presence or absence of a solvent such as water. As a further method, oligomers are first produced by, for example, solution methods, and then the oligomers are polycondensed in solid phase.

The polyamide resin composition of the invention may contain optionally fibrous reinforcements so as to be of higher heat resistance and rigidity. The fibrous reinforcements used include, for example, various organic fibers and inorganic fibers such as glass fibers, carbon fibers, potassium titanate fibers, wollastonite, ceramics fibers, metal coated glass fibers, metal carbide fibers or metal fibers. Inorganic fibers are preferred on account of their high heat resistance, and glass fibers are especially preferred on account of high reinforcing effect. The fibrous reinforcements may be in advance treated with silane coupling agents such as vinyltriethoxysilane, 2-aminopropyltriethoxysilane, 2-glycidoxypropyltrimethoxy-silane, and the like.

The fibrous reinforcements may be contained in amounts usually of not more than about 200 parts by weight, preferably of not more than 150 parts by weight, in relation to 100 parts by weight of the aromatic polyamide resin in the composition. The use in excessive amounts reduces fluidity of the composition to make its molding difficult.

The polyamide resin composition of the invention contains at least one additive selected from the group consisting of a higher fatty acid metal salt and a derivative of an aliphatic carboxylic acid of 26-32 carbons. The metal is selected from the group consisting of the group I, II and III metals of the periodic table. The derivative of the aliphatic carboxylic acid is selected from the group consisting of acid esters, partially saponified esters and metal salts, preferably of alkali or alkaline earth metal salts, in amounts of 0.01-5 parts by weight in relation to 100 parts by weight of the polyamide resin.

The additive improves fluidity in hoppers, melt fluidity and mold releasing properties of the resultant compositions, and prevents thermal decomposition of the polyamide resins to low molecular weight resins, so that the resultant resin composition permits the production of thin walled molded articles.

The higher fatty acid metal salts usable include, for example, salts of metals such as lithium, sodium, potassium, magnesium, barium, zinc or aluminum of fatty acids such as lauric acid, myristic acid, palmitic acid, stearic acid, 12-hydroxystearic acid or behenic acid. More specifically, lithium stearate, sodium stearate, calcium stearate, magnesium stearate, lithium 12-hydroxystearate or calcium 12-hydroxystearate may be mentioned as preferred fatty acid salts.

The derivatives of aliphatic carboxylic acids of 26-32 carbons include, for example, esters of aliphatic carboxylic acids such as cerotic acid, montanic acid or melissic acid, with aliphatic polyhydric alcohols, their partially saponified products or metal salts, preferably alkali or alkaline earth metal salts, of the aliphatic carboxylic acids. Specific preferred examples may be calcium montanate, sodium montanate, lithium montanate or partially potassium saponified products of butylene glycol esters of montanic acid. The derivatives may be used singly or as a mixture of two or more.

The additives are contained in amounts of 0.01-5 parts by weight, preferably of 0.05-1 part by weight, in relation to 100 parts by weight of the aromatic polyamide resins. When the amount of the additives is less than 0.01 part by weight in relation to 100 parts by weight of the aromatic polyamide resins, the resultant resin composition is still of inferior moldability, whereas when the amount of the additives is more than 5 parts by weight, the resultant resin composition has reduced mechanical properties as a tendency.

The composition of the invention may be produced by any conventional method, and may contain, if desired, other additives such as heat stabilizers, wheather stabilizers, fire retardants, antistatic agents, nucleating agents, colorants, blowing agents or fillers, in such amounts as cause no detrioration of desired properties of the composition.

The invention will now be described with reference to examples, however, the invention is not limited thereto.

EXAMPLES 1-9 and COMPARATIVE EXAMPLES 1-4

A heat resistant aromatic polyamide resin was prepared composed of an acid component of 70 mole % of terephthalic acid component and 30 mole % of isophthalic acid component and a diamine component of 100 mole % of 1,6-diaminohexane. The resin was found to have an intrinsic viscosity [η] of 1.0 g/dl as measured in concentrated sulfuric acid at 30° C. and a melting point of 325° C. as measured by a DSC method. The polyamide will be often referred to as PA-1 hereinafter.

An amount of 100 parts by weight of the polyamide was mixed with an additive below in amounts as shown in the Table 1. The additives used will be abbreviated as follows:

L-1: lithium stearate S7000 (Sakai Kagaku Kogyo K. K.)
L-2: calcium stearate (Nippon Yushi K. K.)
L-3: magnesium stearate (Nippon Yushi K. K.)
L-4: calcium 12-hydroxystearate CS600 (Kosei K. K.)

L-5: calcium montanate WAX CAW2 (Hoechst-Japan K. K.)
L-6: sodium montanate WAX NAW1 (Hoechst-Japan K. K.)
L-7: lithium montanate WAX LIW (Hoechst-Japan K. K.)
L-8: partially calcium saponified esters of montanic acid with butylene glycol WAX OP (Hoechst-Japan K. K.)
L-9: ethylenebisstearyl amide ALFLOW H50 (Nippon Yushi K. K.)
L-10: polyethylene glycol PEG 2000 (Wako Junyaku Kogyo K. K.)
L-11: polyethylene wax WAX PE190 (Hoechst-Japan K. K.)

The mixtures were melted and kneaded with a single screw extruder (30 mm diameter, 330° C.) in an extrusion output of 8 Kg/hr to provide pellets. Pressures of resins at the top of the extruder and intrinsic viscosity [η] of the pellets are shown in the Table 1. Further, the pellets were injection-molded at 340° C. with an injection molding machine (IS-50EP, Toshiba Kikai K. K.) to estimate mold-releasing properties and melt fluidity. The results are shown in the Table 1.

The properties were measured as follows:

Mold releasing properties:

Flat molds of 100 mm × 50 mm × 0.8 mm were used at 120° C. A: molded articles were readily released from the molds and no distortion was found; B: distortion was in part found; C: remarkable distortion was found as a whole.

Melt fluidity:

Spiral flows were measured with spiral flow test molds at 70° C. The larger the spiral flow, the better the melt fluidity.

Water absorption:

Specimens were immersed in water at 23° C. for 24 hr and the increase in weight was measured in accordance with ASTM D570.

Tensile strength:

Measured in accordance with ASTM D638.

Tensile strength after water absorption:

Specimens were immersed in water at 23° C. for 24 hr and then tensile strength was measured as above.

Thermal deflection temperature:

Measured under a load of 18.6 Kg/cm² in accordance with ASTM D648.

COMPARATIVE EXAMPLES 5-6

There was used a polyamide resin which was composed of an acid component of 100 mole % of adipic acid and a diamine component of 100 mole % of 1,4-diaminobutane. The resin had an intrinsic viscosity [η] of 1.3 dl/g and a melting point of 292° C. The resin will be often referred to as PA-2 hereinafter, The polyamide resins were mixed with additives shown above, and formed into pellets with a single screw extruder (30 mm diameter, 300° C.) in an extrusion amount of 8 Kg/hr. Then, the pellets were injection-molded at 320° C. with the same injection molding machine as before described, to estimate mold-releasing properties and melt fluidity. The results are shown in the Table 1.

TABLE 1

| | Additive | Amount*) (wt. parts) | Resin Pressure (Kg/cm²) | Intrinsic Viscosity (dl/g) | Mold-releasing Properties |
|---|---|---|---|---|---|
| EXAMPLE 1 | L-1 | 0.3 | 85 | 0.95 | A |
| EXAMPLE 2 | L-2 | 0.3 | 83 | 0.96 | A |
| EXAMPLE 3 | L-3 | 0.3 | 85 | 0.95 | A |
| EXAMPLE 4 | L-4 | 0.3 | 82 | 0.97 | A |
| EXAMPLE 5 | L-5 | 0.3 | 81 | 0.96 | A |
| EXAMPLE 6 | L-6 | 0.3 | 80 | 0.95 | A |
| EXAMPLE 7 | L-7 | 0.3 | 82 | 0.95 | A |
| EXAMPLE 8 | L-8 | 0.3 | 80 | 0.96 | A |
| EXAMPLE 9 | L-8 | 1.0 | 65 | 0.96 | A |
| COMPARATIVE 1 | none | — | 150 | 0.85 | C |
| COMPARATIVE 2 | L-9 | 0.3 | 140 | 0.88 | B |
| COMPARATIVE 3 | L-10 | 0.3 | 130 | 0.83 | B |
| COMPARATIVE 4 | L-11 | 0.3 | 135 | 0.86 | C |
| COMPARATIVE 5 | none | — | 125 | 1.20 | C |
| COMPARATIVE 6 | L-1 | 0.3 | 85 | 1.18 | A |

*)Parts by weight in relation to 100 parts by weight of polyamide resins

| | Spiral Flow (cm) | Water Absorption (%) | Tensile Strength (Kg/cm²) | Tensile Strength*) (Kg/cm²) | Thermal Deflection Temperature (°C.) |
|---|---|---|---|---|---|
| EXAMPLE 1 | 65 | 0.3 | 1100 | 1070 | 140 |
| EXAMPLE 2 | 66 | 0.3 | 1150 | 1080 | 139 |
| EXAMPLE 3 | 65 | 0.4 | 1200 | 1060 | 141 |
| EXAMPLE 4 | 64 | 0.3 | 1100 | 1080 | 142 |
| EXAMPLE 5 | 66 | 0.3 | 1200 | 1090 | 141 |
| EXAMPLE 6 | 67 | 0.4 | 1150 | 1070 | 139 |
| EXAMPLE 7 | 66 | 0.3 | 1150 | 1080 | 140 |
| EXAMPLE 8 | 68 | 0.3 | 1100 | 1070 | 141 |
| EXAMPLE 9 | 75 | 0.3 | 1100 | 1060 | 140 |
| COMPARATIVE 1 | 50 | 0.3 | 1100 | 1060 | 139 |
| COMPARATIVE 2 | 52 | 0.4 | 1150 | 1070 | 139 |
| COMPARATIVE 3 | 53 | 0.3 | 1150 | 1060 | 139 |
| COMPARATIVE 4 | 54 | 0.3 | 1100 | 1060 | 138 |
| COMPARATIVE 5 | 45 | 2.5 | 820 | 620 | 215 |
| COMPARATIVE 6 | 60 | 2.6 | 810 | 610 | 213 |

*)After water absorption

EXAMPLES 10-17 and COMPARATIVE releasing properties and melt fluidity. The results are shown in the Table 2.

TABLE 2

|  | Additive | | Electric Power | |
|  | Amount*) (wt. parts) | | Needed (A) | Mold-releasing Properties |
| --- | --- | --- | --- | --- |
| EXAMPLE 10 | L-1 | 0.3 | 35 | A |
| EXAMPLE 11 | L-2 | 0.3 | 34 | A |
| EXAMPLE 12 | L-4 | 0.3 | 35 | A |
| EXAMPLE 13 | L-5 | 0.3 | 34 | A |
| EXAMPLE 14 | L-6 | 0.3 | 33 | A |
| EXAMPLE 15 | L-7 | 0.3 | 33 | A |
| EXAMPLE 16 | L-8 | 0.3 | 32 | A |
| EXAMPLE 17 | L-8 | 1.0 | 30 | A |
| COMPARATIVE 7 | none | — | 45 | C |
| COMPARATIVE 8 | L-9 | 0.3 | 43 | B |
| COMPARATIVE 9 | L-10 | 0.3 | 42 | B |
| COMPARATIVE 10 | none | — | 41 | C |
| COMPARATIVE 11 | L-1 | 0.3 | 34 | A |

*)Parts by weight in relation to 100 parts by weight of polyamide resins

|  | Spiral Flow (cm) | Water Absorption (%) | Tensile Strength (Kg/cm$^2$) | Tensile Strength*) (Kg/cm$^2$) | Thermal Deflection Temperature (°C.) |
| --- | --- | --- | --- | --- | --- |
| EXAMPLE 10 | 52 | 0.2 | 2300 | 2030 | 295 |
| EXAMPLE 11 | 51 | 0.2 | 2250 | 2000 | 296 |
| EXAMPLE 12 | 52 | 0.2 | 2300 | 2050 | 294 |
| EXAMPLE 13 | 52 | 0.2 | 2350 | 2040 | 295 |
| EXAMPLE 14 | 53 | 0.2 | 2250 | 2080 | 294 |
| EXAMPLE 15 | 53 | 0.2 | 2300 | 2050 | 296 |
| EXAMPLE 16 | 55 | 0.2 | 2250 | 2010 | 295 |
| EXAMPLE 17 | 60 | 0.2 | 2230 | 1980 | 296 |
| COMPARATIVE 7 | 40 | 0.2 | 2200 | 2000 | 294 |
| COMPARATIVE 8 | 41 | 0.3 | 2200 | 2050 | 294 |
| COMPARATIVE 9 | 42 | 0.2 | 2250 | 2030 | 293 |
| COMPARATIVE 10 | 32 | 1.1 | 2000 | 1400 | 285 |
| COMPARATIVE 11 | 45 | 1.2 | 1950 | 1350 | 283 |

*)After water absorption

EXAMPLES 7-9

An amount of 60 parts by weight of the resin PA-1 was mixed with 40 parts by weight of glass fibers (03MA486A, Asahi Fiber Glass K. K.) and additives in amounts shown in the Table 2.

The mixtures were melted and kneaded with a twin screw vent type extruder (30 mm diameter, 330° C.) in an extrusion output of 20 Kg/hr to provide pellets. Electric power needed for the melting and kneading is shown in the Table 2.

The pellets were injection-molded in the same manner as in the first EXAMPLES to estimate mold-releasing properties and melt fluidity. The results are shown in the Table 2.

COMPARATIVE EXAMPLES 10-11

An amount of 70 parts by weight of the resin PA-2 was mixed with 30 parts by weight of the same glass fibers as before, and additives in amounts shown in the Table 2, and the mixtures were formed into pellets with a single screw extruder (30 mm diameter, 300° C.) in an extrusion amount of 8 Kg/hr. Then, the pellets were injection-molded at 320° C. with the same injection molding machine as before described, to estimate mold-releasing properties and melt fluidity. The results are shown in the Table 2.

EXAMPLES 18-26 and COMPARATIVE EXAMPLES 12-15

A heat resistant aromatic polyamide resin was prepared composed of an acid component of 60 mole % of terephthalic acid component and 40 mole % of adipic acid component and a diamine component of 100 mole % of 1,6-diaminohexane. The resin was found to have an intrinsic viscosity [η] of 1.1 g/dl as measured in concentrated sulfuric acid at 30° C. and a melting point of 325° C. as measured by a DSC method. The polyamide will be often referred to as PA-3 hereinafter.

An amount of 100 parts by weight of the polyamide was mixed with an additive as mentioned before in amounts shown in the Table 3.

The mixtures were melted and kneaded with a single screw extruder (30 mm diameter, 330° C.) in an extrusion amount of 8 Kg/hr to provide pellets. Pressures of resins at the top of the extruder and intrinsic viscosity [η] of the pellets are shown in the Table 3. Further, the pellets were injection-molded in the same manner as in the first EXAMPLES to estimate the properties of the compositions. The results are shown in the Table 3.

TABLE 3

|  | Additive | | Resin Pressure (Kg/cm$^2$) | Intrinsic Viscosity (dl/g) | Mold-releasing Properties |
|  | Amount*) (wt. parts) | | | | |
| --- | --- | --- | --- | --- | --- |
| EXAMPLE 18 | L-1 | 0.3 | 82 | 1.13 | A |
| EXAMPLE 19 | L-2 | 0.3 | 80 | 1.12 | A |
| EXAMPLE 20 | L-3 | 0.3 | 78 | 1.11 | A |
| EXAMPLE 21 | L-4 | 0.3 | 79 | 1.13 | A |
| EXAMPLE 22 | L-4 | 1.0 | 70 | 1.11 | A |
| EXAMPLE 23 | L-5 | 0.3 | 80 | 1.13 | A |
| EXAMPLE 24 | L-6 | 0.3 | 81 | 1.12 | A |

TABLE 3-continued

| | | | | | |
|---|---|---|---|---|---|
| EXAMPLE 25 | L-7 | 0.3 | 80 | 1.13 | A |
| EXAMPLE 26 | L-8 | 0.3 | 82 | 1.13 | A |
| COMPARATIVE 12 | none | — | 135 | 1.10 | C |
| COMPARATIVE 13 | L-9 | 0.3 | 130 | 1.11 | B |
| COMPARATIVE 14 | L-10 | 0.3 | 133 | 1.10 | B |
| COMPARATIVE 15 | L-11 | 0.3 | 135 | 1.11 | C | a) Parts by weight in relation to 100 parts by weight of polyamide resins

| | Spiral Flow (cm) | Water Absorption (%) | Tensile Strength ($Kg/cm^2$) | Tensile Strength*) ($Kg/cm^2$) | Thermal Deflection Temperature (°C.) |
|---|---|---|---|---|---|
| EXAMPLE 18 | 62 | 0.4 | 970 | 850 | 121 |
| EXAMPLE 19 | 64 | 0.4 | 980 | 870 | 119 |
| EXAMPLE 20 | 67 | 0.4 | 960 | 830 | 120 |
| EXAMPLE 21 | 66 | 0.4 | 970 | 850 | 122 |
| EXAMPLE 22 | 75 | 0.5 | 940 | 820 | 120 |
| EXAMPLE 23 | 60 | 0.4 | 960 | 830 | 119 |
| EXAMPLE 24 | 61 | 0.4 | 970 | 850 | 121 |
| EXAMPLE 25 | 60 | 0.4 | 970 | 840 | 120 |
| EXAMPLE 26 | 61 | 0.4 | 960 | 830 | 121 |
| COMPARATIVE 12 | 48 | 0.4 | 970 | 850 | 120 |
| COMPARATIVE 13 | 49 | 0.4 | 980 | 830 | 120 |
| COMPARATIVE 14 | 49 | 0.4 | 970 | 850 | 119 |
| COMPARATIVE 15 | 48 | 0.4 | 970 | 820 | 121 |

*) After water absorption

EXAMPLES 27-35 and COMPARATIVE EXAMPLES 16-18

An amount of 60 parts by weight of the resin PA-3 was mixed with 40 parts by weight of the same glass fibers as before, and additives as mentioned before in amounts shown in the Table 4.

The mixtures were melted and kneaded with a two screw vented extruder (30 mm diameter, 330° C.) in an extrusion amount of 20 Kg/hr to provide pellets. The pellets were injection-molded in the same manner as in the first EXAMPLES to estimate the properties of the compositions. The results are shown in the Table 4.

TABLE 4

| | Additive | Amount*) (wt. parts) | Electric Power Needed (A) | Mold-releasing Properties |
|---|---|---|---|---|
| EXAMPLE 27 | L-1 | 0.3 | 36 | A |
| EXAMPLE 28 | L-2 | 0.3 | 35 | A |
| EXAMPLE 29 | L-3 | 0.3 | 32 | A |
| EXAMPLE 30 | L-4 | 0.3 | 34 | A |
| EXAMPLE 31 | L-4 | 1.0 | 30 | A |
| EXAMPLE 32 | L-5 | 0.3 | 35 | A |
| EXAMPLE 33 | L-6 | 0.3 | 35 | A |
| EXAMPLE 34 | L-7 | 0.3 | 34 | A |
| EXAMPLE 35 | L-8 | 0.3 | 33 | A |
| COMPARATIVE 16 | none | — | 45 | C |
| COMPARATIVE 17 | L-9 | 0.3 | 43 | B |
| COMPARATIVE 18 | L-10 | 0.3 | 42 | B | a) Parts by weight in relation to 100 parts by weight of polyamide resins

| | Spiral Flow (cm) | Water Absorption (%) | Tensile Strength ($Kg/cm^2$) | Tensile Strength*) ($Kg/cm^2$) | Thermal Deflection Temperature (°C.) |
|---|---|---|---|---|---|
| EXAMPLE 27 | 49 | 0.2 | 2100 | 1920 | 300 |
| EXAMPLE 28 | 48 | 0.2 | 2150 | 1950 | 301 |
| EXAMPLE 29 | 52 | 0.2 | 2100 | 1900 | 298 |
| EXAMPLE 30 | 51 | 0.2 | 2150 | 1900 | 299 |
| EXAMPLE 31 | 60 | 0.2 | 2100 | 1850 | 301 |
| EXAMPLE 32 | 47 | 0.2 | 2100 | 1900 | 302 |
| EXAMPLE 33 | 48 | 0.2 | 2150 | 1950 | 299 |
| EXAMPLE 34 | 49 | 0.2 | 2100 | 1900 | 300 |
| EXAMPLE 35 | 48 | 0.2 | 2100 | 1950 | 302 |
| COMPARATIVE 16 | 40 | 0.2 | 2150 | 1900 | 301 |
| COMPARATIVE 17 | 41 | 0.3 | 2100 | 1850 | 298 |
| COMPARATIVE 18 | 42 | 0.2 | 2100 | 1900 | 299 |

*) After water absorption

What is claimed is:

1. A polyamide resin molding composition which comprises:
(A) as the sole polyamide of the composition an aromatic polyamide resin consisting essentially of (a) a wholly aromatic dicarboxylic acid component which consists essentially of a terephthalic acid component in amounts of 40-100 mole % and an aromatic dicarboxylic acid component other than the terephthalic acid component in amounts of 60-0 mole %, the total of the terephthalic acid component and the other dicarboxylic acid component being 100 mole % and, (b) a diamine component comprising at least one of an aliphatic diamine component and an alicyclic diamine component;

(B) a fibrous reinforcement in amount of 0–200 parts by weight in relation to 100 parts by weight of the polyamide resin; and (C) at least one additive selected from the group consisting of a higher fatty acid metal salt and a derivative of an aliphatic carboxylic acid of 26–32 carbons, the metal being selected from the I, II and III group metals of the periodic table, and the derivative being selected from the group consisting of an acid ester, a partially saponified ester and a metal salt, in amounts of 0.01–5 parts by weight in relation to 100 parts by weight of the polyamide resin.

2. The polyamide resin composition as claimed in claim 1, wherein the dicarboxylic acid component contains the terephthalic acid component in amounts of 50–100 mole %, and the other dicarboxylic acid components in amounts of 50–0 mole %, and wherein the diamine component is composed of aliphatic diamine components of 5–11 carbons.

3. The polyamide resin composition as claimed in claim 2, wherein the diamine component is composed of aliphatic diamine components of 6–10 carbons.

4. A polyamide resin molding composition comprising (a) an aromatic dicarboxylic component which contains a terephthalic acid component in amounts of 75–100 mole %, and aromatic dicarboxylic acid components other than the terephthalic acid component in amounts of 25–0 mole %, and a diamine component composed of aliphatic diamine components of 10–18 carbons;

(B) a fibrous reinforcement in amounts of 0–200 parts by weight in relation to 100 parts by weight of the polyamide resin; and (C) at least one additive selected from the group consisting of a higher fatty acid salt and a derivative of an aliphatic carboxylic acid of 26–32 carbons, the metal being selected from the I, II and III group metals of the periodic table, and the derivative being selected from the group consisting of an acid ester, a partially saponified ester and a metal salt, in amounts of 0.01–5 parts by weight in relation to 100 parts by weight of the polyamide resin.

5. The polyamide resin composition as claimed in claim 1, wherein the polyamide resin has an intrinsic viscosity of not less than 0.5 dl/g as measured in concentrated sulfuric acid at a temperature of 30° C.

6. The polyamide resin composition as claimed in claim 1, wherein the fibrous reinforcement is present and are organic fibers or inorganic fibers.

7. The polyamide resin composition as claimed in claim 6, wherein the organic fibers are glass fibers.

8. The polyamide resin molding composition according to claim 1 wherein the aromatic dicarboxylic acid component consists essentially of a terephthalic acid component in an amount of 60–100 mole % and an aromatic dicarboxylic acid component other than the terephthalic acid component in an amount of 40–0 mole %, the total of the terephthalic acid component and the aromatic dicarboxylic acid component being 100 mole %.

9. The polyamide resin molding composition of claim 2 wherein the inorganic glass fiber are present in amount of not more than 150 parts by weight, in relation to 100 parts by weight of the polyamide resin.

10. The polyamide resin molding composition of claim 1 wherein the additive (C) is present in amount of 0.05 to 1 part by weight per 100 parts by weight of the polyamide resin.

11. The polyamide resin molding composition of claim 10 wherein the additive (C) is a higher fatty acid metal salt.

12. The polyamide resin molding composition of claim 11 wherein the higher fatty acid metal salt is a lithium, sodium, potassium, magnesium, barium, zinc or aluminum salt of lauric acid, myristic acid, palmitic acid, stearic acid, 12-hydroxystearic acid or behenic acid.

13. The polyamide resin molding composition of claim 12 wherein the higher fatty acid metal salt is lithium stearate, sodium stearate, calcium stearate, magnesium stearate, lithium 12-hydroxystearate or calcium 12-hydroxystearate.

14. The polyamide resin molding composition of claim 10 wherein the additive (C) is said derivative of an aliphatic carboxylic acid of 26–32 carbons.

15. The polyamide resin molding composition of claim 14 wherein the derivative is an ester of cerotic acid, montanic acid or melissic acid with an aliphatic polyhydric alcohol, or a partially saponified product or metal salt thereof.

16. The polyamide resin molding composition of claim 15 wherein the derivative is calcium montanate, sodium montanate, lithium montanate or partially potassium saponified product of butylene glycol ester of montanic acid.

17. The polyamide resin molding composition of claim 1 wherein the additive (C) is a higher fatty acid metal salt.

18. The polyamide resin molding composition of claim 17 wherein the higher fatty acid metal salt is a lithium, sodium, potassium, magnesium, barium, zinc or aluminum salt of lauric acid, myristic acid, palmitic acid, stearic acid, 12-hydroxystearic acid or behenic acid.

19. The polyamide resin molding composition of claim 18 wherein the higher fatty acid metal salt is lithium stearate, sodium stearate, calcium stearate, magnesium stearate, lithium 12-hydroxystearate or calcium 12-hydroxystearate.

20. The polyamide resin molding composition of claim 1 wherein the additive (C) is said derivative of an aliphatic carboxylic acid of 26–32 carbons.

21. The polyamide resin molding composition of claim 20 wherein the derivative is an ester of cerotic acid, montanic acid or melissic acid with an aliphatic polyhydric alcohol, or a partially saponified product or metal salt thereof.

22. The polyamide resin molding composition of claim 21 wherein the derivative is calcium montanate, sodium montanate, lithium montanate or partially potassium saponified product of butylene glycol ester of montanic acid.

23. The polyamide resin molding composition of claim 4 wherein the fibrous reinforcement is present and are organic fibers or inorganic fibers.

24. The polyamide resin molding composition of claim 23 wherein the reinforcing fibers comprise inorganic glass fibers.

25. The polyamide resin molding composition of claim 4 wherein the additive (C) is present in amount of 0.05 to 1 part by weight per 100 parts by weight of the polyamide resin.

26. The polyamide resin molding composition of claim 25 wherein the additive (C) is a higher fatty acid metal salt.

27. The polyamide resin molding composition of claim 26 wherein the higher fatty acid metal salt is a lithium, sodium, potassium, magnesium, barium, zinc or aluminum salt of lauric acid, myristic acid, palmitic acid, stearic acid, 12-hydroxystearic acid or behenic acid.

28. The polyamide resin molding composition of claim 27 wherein the higher fatty acid metal salt is lithium stearate, sodium stearate, calcium stearate, magnesium stearate, lithium 12-hydroxystearate or calcium 12-hydroxystearate.

29. The polyamide resin molding composition of claim 25 wherein the additive (C) is said derivative of an aliphatic carboxylic acid of 26-32 carbons.

30. The polyamide resin molding composition of claim 29 wherein the derivative is an ester of cerotic acid, montanic acid or melissic acid with an aliphatic polyhydric alcohol, or a partially saponified product or metal salt thereof.

31. The polyamide resin molding composition of claim 30 wherein the derivative is calcium montanate, sodium montanate, lithium montanate or partially potassium saponified product of butylene glycol ester of montanic acid.

* * * * *